(12) United States Patent
Liu et al.

(10) Patent No.: US 9,564,775 B2
(45) Date of Patent: Feb. 7, 2017

(54) UNINTERRUPTIBLE POWER SUPPLY AND DC-DC CONVERTER

(71) Applicant: Huawei Technologies Co., Ltd., Shenzhen (CN)

(72) Inventors: Peiguo Liu, Shenzhen (CN); Zhenfu Fei, Xi'an (CN); Yanan Zhou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 553 days.

(21) Appl. No.: 14/143,106

(22) Filed: Dec. 30, 2013

(65) Prior Publication Data

US 2014/0111005 A1 Apr. 24, 2014

Related U.S. Application Data

(63) Continuation of application No. PCT/CN2012/078279, filed on Jul. 6, 2012.

(30) Foreign Application Priority Data

Jan. 17, 2012 (CN) .......................... 2012 1 0013896

(51) Int. Cl.
*H02J 9/06* (2006.01)
*H02M 3/158* (2006.01)
(Continued)

(52) U.S. Cl.
CPC .................. *H02J 9/04* (2013.01); *H02J 9/062* (2013.01); *H02M 3/1584* (2013.01);
(Continued)

(58) Field of Classification Search
CPC ...... H02J 9/062; H02J 2009/0063; H02J 9/04; H02M 1/10; H02M 1/4216; H02M 1/4225; H02M 1/4233; H02M 3/158; H02M 3/1584; H02M 2003/1586; Y10T 307/625; Y10T 307/615; Y10T 307/32

See application file for complete search history.

(56) References Cited

U.S. PATENT DOCUMENTS 5,932,995 A 8/1999 Wagoner
6,979,980 B1 12/2005 Hesterman et al.
(Continued)

FOREIGN PATENT DOCUMENTS

CN 1808832 A 7/2006
CN 101222148 A 7/2008
(Continued)

OTHER PUBLICATIONS

Foreign Communication From A Counterpart Application, PCT Application No. PCT/CN2012/078279, Chinese Search Report dated Dec. 6, 2012, 7 pages.
(Continued)

*Primary Examiner* — Ryan Johnson
(74) *Attorney, Agent, or Firm* — Conley Rose, P.C.

(57) ABSTRACT

An uninterruptable power supply (UPS) and a direct current-direct current (DC-DC) converter. An input end of the DC-DC converter is connected to a BUS+, a BUS−, and an N wire, and a load in the DC-DC converter is connected to a switch tube through an inductor rather than being directly connected to the switch tube.

20 Claims, 9 Drawing Sheets

(51) Int. Cl.
*H02J 9/04* (2006.01)
*H02M 1/42* (2007.01)

(52) U.S. Cl.
CPC ...... *H02J 2009/063* (2013.01); *H02M 1/4225* (2013.01); *H02M 2003/1586* (2013.01); *Y10T 307/32* (2015.04); *Y10T 307/625* (2015.04)

(56) References Cited

U.S. PATENT DOCUMENTS

| | | | |
|---|---|---|---|
| 7,705,489 B2* | 4/2010 | Nielsen | H02J 9/062 |
| | | | 307/66 |
| 8,228,690 B2* | 7/2012 | Watanabe | H02J 1/10 |
| | | | 307/43 |
| 8,432,138 B2* | 4/2013 | Chen | H02M 1/4233 |
| | | | 323/207 |
| 2004/0160789 A1 | 8/2004 | Ying et al. | |
| 2006/0214513 A1 | 9/2006 | Tan et al. | |
| 2008/0061628 A1 | 3/2008 | Nielsen et al. | |
| 2014/0103728 A1 | 4/2014 | Shrivastava et al. | |
| 2014/0103898 A1 | 4/2014 | Shrivastava et al. | |

FOREIGN PATENT DOCUMENTS

| | | |
|---|---|---|
| CN | 101232191 A | 7/2008 |
| CN | 101814762 A | 8/2010 |

OTHER PUBLICATIONS

Foreign Communication From A Counterpart Application, PCT Application No. PCT/CN2012/078279, Chinese Written Opinion dated Dec. 6, 2012, 4 pages.
Partial English Translation and Abstract of Chinese Patent Application No. CN001808832A, Jan. 15, 2014, 3 pages.
Partial English Translation and Abstract of Chinese Patent Application No. CN101814762A, Apr. 28, 2014, 5 pages.
Foreign Communication From A Counterpart Application, Chinese Application No. 201210013896.8, Chinese Office Action dated Aug. 28, 2014, 7 pages.
Foreign Communication From A Counterpart Application, European Application No. 12865870.5, Extended European Search Report dated Jul. 31, 2015, 9 pages.
Sha, Zhanyou, et al., "Optimal Design of Switching Power Supply," Heibi University of Science and Technology, China, 2015, 3 pages.
Kaplan, Steven M., Lexicographer, "Wiley Electrical and Electronics Engineering Dictionary," 2004, 3 pages.

* cited by examiner

UNINTERRUPTIBLE POWER SUPPLY AND DC-DC CONVERTER

CROSS-REFERENCE TO RELATED APPLICATIONS

This application is a continuation of International Application No. PCT/CN2012/078279, filed on Jul. 6, 2012, which claims priority to Chinese Patent Application No. 201210013896.8, filed on Jan. 17, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of uninterruptible power supply technologies, and in particular, to an Uninterruptible Power Supply (UPS) and a Direct Current-Direct Current (DC-DC) converter.

BACKGROUND

Online type UPSs are widely used on all kinds of power supply occasions. A UPS circuit of the type generally includes three portions.

A first portion is an alternating-direct current conversion circuit, that is, a rectifying circuit, for converting an alternating current into a direct current.

A second portion is an inversion circuit for inverting a direct current to an alternating current.

A third portion is a direct current-direct current circuit for converting a voltage of a battery into a direct current voltage required by the inversion circuit of the second portion.

A UPS charger is a charging apparatus for charging the battery mounted on the UPS of the third portion.

At present, in designs of the UPS charger, generally two manners are adopted.

One is an isolation manner, for example, a conventional flyback isolation circuit, a forward isolation circuit, or another isolation circuit is used as a charging circuit. In this manner, an isolation conversion volume is large and costs are relatively high.

The other is a non-isolation manner, for example, a conventional single BUCK circuit, a dual BUCK circuit, or a BUCK three-level circuit.

The battery mounted on the UPS is closely related to a topology of a main circuit. In order to improve efficiency and lower costs, the mounted battery is integrated with the main circuit. Therefore, the UPS charger usually adopts the non-isolation manner.

The following introduces a UPS charger in the non-isolation manner in the prior art with reference to the accompanying drawings. In FIG. 1, FIG. 2, and FIG. 3, a positive bus BUS+, a negative bus BUS−, and an N wire are output ends of a rectifying circuit.

Referring to FIG. 1, FIG. 1 is a circuit diagram of a UPS charger with a single BUCK topology in the prior art.

As shown in FIG. 1, inputs of the topology are a BUS+ and a BUS−.

A working principle of the topology is: when a switch tube Q1 is turned on, a current flow direction is (BUS+)-Q1-L1-BAT-(BUS−), the BUS+ and the BUS− charge the BAT through the L1, and the L1 stores energy at the same time; when the Q1 is cut off, a current flow direction is L1-BAT-(BUS−)-D1 and the L1 releases the energy to charge the BAT.

Disadvantages of a topology of the type are: the inputs are connected to the BUS+ and the BUS− and input voltages are relatively high, causing relatively high voltage resistance of the device models in the BUCK topology. In this case, costs are relatively high, loss is relatively large, and efficiency is low.

Referring to FIG. 2, FIG. 2 is a circuit diagram of a UPS charger with a dual BUCK topology in the prior art.

The dual BUCK topology refers to two superposed single BUCK topologies. The UPS charger includes two batteries: a BAT1 and a BAT2.

As shown in FIG. 2, inputs of the topology are a BUS+, a BUS−, and an N wire.

Working principles of the topology include the following:

1) In a positive semi-cycle of a power grid voltage, a second switch tube Q2 is turned off and a first switch tube Q1 works.

When the Q1 is turned on, a current flow direction is (BUS+)-Q1-L1-BAT1-N, the BUS+ charges the BAT1 through the L1, and the L1 stores energy at the same time.

When the Q1 is cut off, a current flow direction is L1-BAT1-N-D1 and the L1 releases the energy to charge the BAT1.

2) In a negative semi-cycle of the power grid voltage, the Q1 is turned off and the Q2 works.

When the Q2 is turned on, a current flow direction is N-BAT2-L2-Q2-(BUS+), the BUS− charges the BAT2 through the L2, and the L2 stores energy at the same time.

When the Q2 is cut off, a current flow direction is N-BAT2-L2-D2 and the L2 releases the energy to charge the BAT2.

Compared with the single BUCK, a topology of the type has the following advantages: the inputs are connected to the BUS+, the BUS−, and the N wire and input voltages are low, a device with low voltage resistance may be selected as the device in the BUCK topology. However, disadvantages of the topology of the type are: two sets of BUCK circuits are required, the number of devices is large, and two groups of batteries (the BAT1 and the BAT2) are also required, so the costs are relatively high. In addition, when a voltage of the BUS is relatively low, a requirement for charging the batteries cannot be satisfied. For example, when a voltage of a single side BUS (between the BUS+ and the N wire, or between the BUS− and the N wire) is lower than a voltage of a battery, the battery cannot be charged.

Referring to FIG. 3, FIG. 3 is a circuit diagram of a UPS charger with a BUCK three-level topology in the prior art.

As shown in FIG. 3, inputs of the topology are a BUS+, a BUS−, and an N wire.

Working principles of the topology include the following:

1) In a positive semi-cycle of a power grid voltage, a second switch tube Q2 is turned off and a first switch tube Q1 works.

When the Q1 is turned on, a current flow direction is (BUS+)-Q1-L1-BAT-D2-N, the BUS+ charges the BAT through the L1, and the L1 stores energy at the same time.

When the Q1 is cut off, a current flow direction is L1-BAT-D2-D1 and the L1 releases the energy to charge the BAT.

2) In a negative semi-cycle of the power grid voltage, the Q1 is turned off and the Q2 works.

When the Q2 is turned on, a current flow direction is N-D1-L1-BAT-Q2-(BUS−), the BUS− charges the BAT through the L1, and the L1 stores energy at the same time.

When the Q2 is cut off, a current flow direction is L1-BAT-D2-D1 and the L1 releases the energy to charge the BAT.

Disadvantages of the topology are: a negative end of the BAT is connected to the Q2. In this way, the BAT can be easily interfered by a high-frequency switch wave of the Q2. The N wire is also interfered by the high-frequency switch wave. In this case, battery performance and electromagnetic compatibility of a whole circuit may be affected.

SUMMARY

Embodiments of the present invention provide an uninterruptible power supply and a DC-DC converter. The DC-DC converter can improve electromagnetic compatibility of a whole circuit. Meanwhile, a device with low voltage resistance may be selected as a device in the DC-DC converter and the number of devices is relatively small, so costs are relatively low.

An embodiment of the present invention provides a UPS, including a rectifier, an inverter, and a DC-DC converter, where an input end of the rectifier is connected to a power grid and an output end thereof is connected to the inverter and the DC-DC converter; the rectifier is configured to convert an alternating current provided by the power grid into a direct current and output the direct current to the inverter or the DC-DC converter; an input end of the inverter is connected to the output end of the rectifier; the inverter is configured to invert the direct current obtained by the rectifier to an alternating current; an input end of the DC-DC converter is connected to the output end of the rectifier and an output end thereof is connected to a battery; the DC-DC converter is configured to charge the battery using the power supply output by the rectifier; the output end of the rectifier includes a positive bus BUS+, a negative bus BUS−, and an N wire; an output end of the battery is connected to the rectifier; and a voltage output by the battery, after being boosted by the rectifier, provides a direct current to the inverter; the DC-DC converter includes: a first capacitor, a second capacitor, a third capacitor, a first switch tube, a second switch tube, a first inductor, a second inductor, a third switch tube, and a fourth switch tube; the positive bus BUS+ is connected to a first node through the first switch tube; the negative bus BUS− is connected to a second node through the second switch tube; two ends of the first capacitor are respectively connected to the BUS+ and the N wire; two ends of the second capacitor are respectively connected to the BUS− and the N wire; the third switch tube is connected between the first node and the N wire; the fourth switch tube is connected between the second node and the N wire; the first inductor, the battery, and the second inductor connected in series are connected in sequence between the first node and the second node; and two ends of the third capacitor are respectively connected to the first node and the second node, or, the third capacitor is connected in parallel at two ends of the battery, or, one end of the third capacitor is connected to the first node and the other end thereof is connected to a common end of the battery and the second inductor, or, one end of the third capacitor is connected to the second node and the other end thereof is connected to a common end of the battery and the first inductor.

An embodiment of the present invention provides a DC-DC converter, including: a first capacitor, a second capacitor, a third capacitor, a first switch tube, a second switch tube, a first inductor, a second inductor, a third switch tube, and a fourth switch tube, where a positive bus BUS+ is connected to a first node through the first switch tube; a negative bus BUS− is connected to a second node through the second switch tube; two ends of the first capacitor are respectively connected to the BUS+ and an N wire; two ends of the second capacitor are respectively connected to the BUS− and the N wire; the third switch tube is connected between the first node and the N wire; the fourth switch tube is connected between the second node and the N wire; the first inductor, a load, and the second inductor connected in series are connected in sequence between the first node and the second node; and two ends of the third capacitor are respectively connected to the first node and the second node, or, the third capacitor is connected in parallel at two ends of the load, or, one end of the third capacitor is connected to the first node and the other end thereof is connected to a common end of the load and the second inductor, or, one end of the third capacitor is connected to the second node and the other end thereof is connected to a common end of the load and the first inductor.

It can be seen that, the embodiments of the present invention provide the UPS power supply and the DC-DC converter. The input end of the DC-DC converter is connected to the BUS+, the BUS−, and the N wire. In this way, the input voltage is relatively low, where a device with low voltage resistance may be selected as a device in the DC-DC converter. Moreover, the battery or the load in the DC-DC converter provided in the embodiments of the present invention is connected to the second switch tube through the second inductor rather than be directly connected to the second switch tube. Therefore, a high-frequency switch wave on the second switch tube may not affect the load. In this case, performance of the load and an anti-electromagnetic interference capability of the whole circuit may be improved. In addition, the DC-DC converter provided in the embodiments of the present invention does not have a structure as complicated as that of a dual BUCK topology in the prior art. Therefore, the DC-DC converter, with respect to the dual BUCK topology, has less devices and lower costs.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. The accompanying drawings in the following description merely show some embodiments of the present invention, and persons of ordinary skill in the art can derive other drawings from these accompanying drawings without creative efforts.

DETAILED DESCRIPTION

The following clearly describes the technical solutions according to the embodiments of the present invention with reference to the accompanying drawings in the embodiments of the present invention. The embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
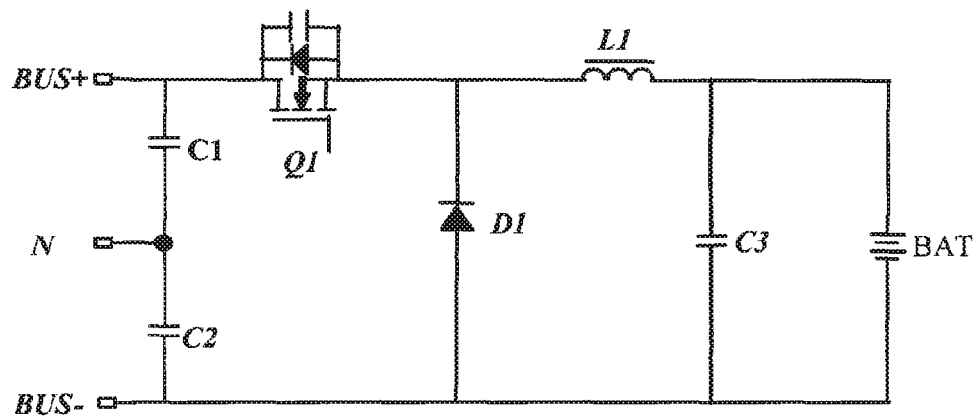
FIG. 1 is a circuit diagram of a UPS charger with a single BUCK topology in the prior art.
Figure 2:
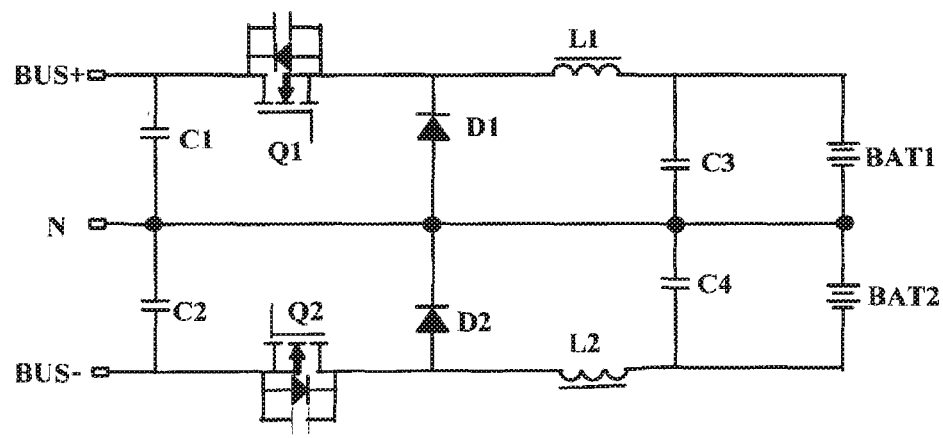
FIG. 2 is a circuit diagram of a UPS charger with a dual BUCK topology in the prior art.
Figure 3:
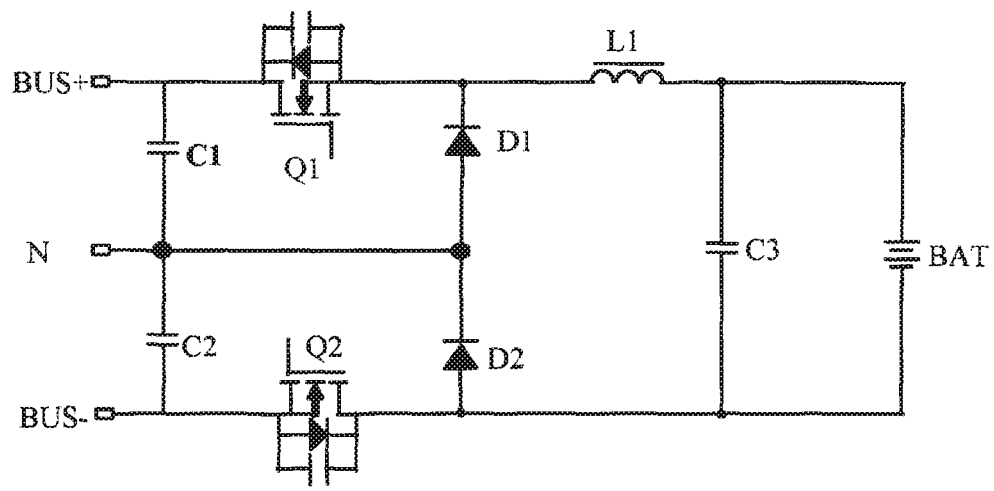
FIG. 3 is a circuit diagram of a UPS charger with a BUCK three-level topology in the prior art.
Figure 4:
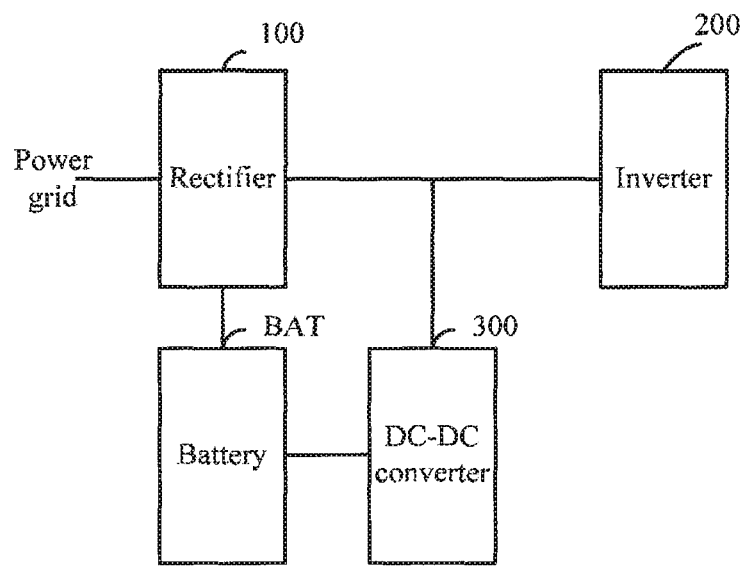
FIG. 4 is a schematic diagram of function modules in a UPS embodiment according to an embodiment of the present invention.

Referring to FIG. 4, FIG. 4 is a schematic diagram of function modules of a UPS provided in an embodiment of the present invention.

First, implementation of a UPS provided in the embodiment of the present invention is described. The UPS includes: a rectifier 100, an inverter 200, and a DC-DC converter 300.

An input end of the rectifier 100 is connected to a power grid and an output end thereof is connected to the inverter 200 and the DC-DC converter 300. The rectifier 100 is configured to convert an alternating current provided by the power grid into a direct current and output the direct current to the inverter 200 or the DC-DC converter 300.

An input end of the inverter 200 is connected to the output end of the rectifier 100. The inverter 200 is configured to invert the direct current obtained from the rectifier 100 to an alternating current.

An input end of the DC-DC converter 300 is connected to the output end of the rectifier 100 and an output end thereof is connected to a battery BAT. The DC-DC converter 300 is configured to charge the BAT using the power supply output by the rectifier 100. The output end of the rectifier 100 includes a positive bus BUS+, a negative bus BUS−, and an N wire. An output end of the BAT is connected to the rectifier 100. A voltage output by the BAT, after being boosted by the rectifier 100, provides a direct current to the inverter 200.

The output end of the battery BAT is connected to the rectifier 100. The voltage output by the battery BAT, after being boosted by the rectifier 100, provides a direct current to the inverter 200.

The DC-DC converter 300 includes: a first capacitor, a second capacitor, a third capacitor, a first switch tube, a second switch tube, a first inductor, a second inductor, a third switch tube, and a fourth switch tube.

The positive bus BUS+ is connected to a first node through the first switch tube. The negative bus BUS− is connected to a second node through the second switch tube.

Two ends of the first capacitor are respectively connected to the BUS+ and the N wire. Two ends of the second capacitor are respectively connected to the BUS− and the N wire.

The third switch tube is connected between the first node and the N wire.

The fourth switch tube is connected between the second node and the N wire.

The first inductor, the battery, and the second inductor connected in series are connected in sequence between the first node and the second node.

Two ends of the third capacitor are respectively connected to the first node and the second node, or, the third capacitor is connected in parallel at two ends of the battery, or, one end of the third capacitor is connected to the first node and the other end thereof is connected to a common end of the battery and the second inductor, or, one end of the third capacitor is connected to the second node and the other end thereof is connected to a common end of the battery and the first inductor. It should be noted that, in the embodiment of the present invention, only the DC-DC converter 300 in the UPS is improved, and the rectifier 100 and the inverter 200 may be implemented using mature technologies. The embodiment of the present invention does not limit a specific structure of the rectifier 100 and that of the inverter 200.

The following describes implementation of a DC-DC converter in an embodiment of the present invention. The DC-DC converter includes: a first capacitor, a second capacitor, a third capacitor, a first switch tube, a second switch tube, a first inductor, a second inductor, a third switch tube, and a fourth switch tube.

A positive bus BUS+ is connected to a first node through the first switch tube. A negative bus BUS− is connected to a second node through the second switch tube.

Two ends of the first capacitor are respectively connected to the BUS+ and an N wire. Two ends of the second capacitor are respectively connected to the BUS− and the N wire.

The third switch tube is connected between the first node and the N wire.

The fourth switch tube is connected between the second node and the N wire.

The first inductor, a load, and the second inductor connected in series are connected in sequence between the first node and the second node. Two ends of the third capacitor are respectively connected to the first node and the second node, or, the third capacitor is connected in parallel at two ends of the load, or, one end of the third capacitor is connected to the first node and the other end thereof is connected to a common end of the load and the second inductor, or, one end of the third capacitor is connected to the second node and the other end thereof is connected to a common end of the load and the first inductor.

It should be noted that, the "first", "second", or "third" stated in the embodiments of the present invention are not intended to limit that there is only one device. For example, for a capacitor of the "third capacitor", an implementation manner is not limited to only one capacitor, but also may be two or more capacitors connected in series.

Embodiment 1

Figure 5:
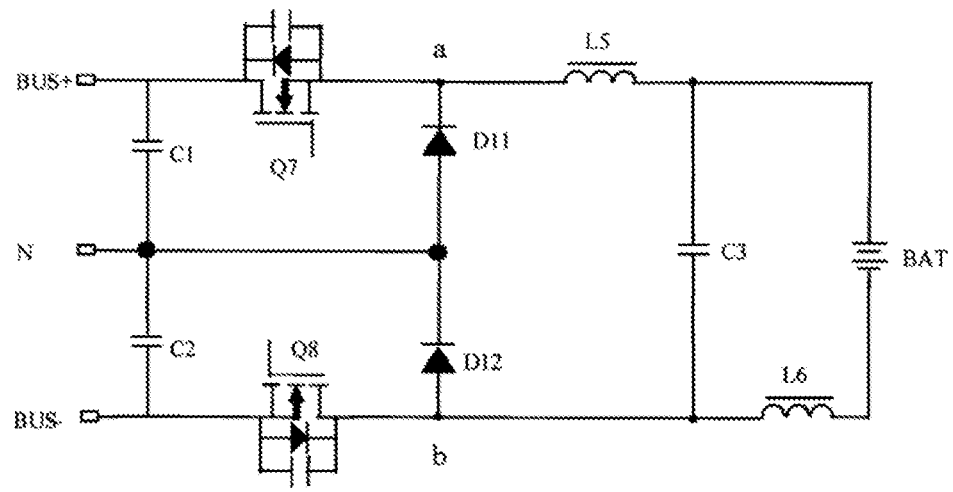
FIG. 5 is a schematic diagram of Embodiment 1 of a DC-DC converter according to an embodiment of the present invention.

Referring to FIG. 5, FIG. 5 is a schematic diagram of Embodiment 1 of a DC-DC converter provided in the present invention.

The DC-DC converter provided in this embodiment includes: a first capacitor C1, a second capacitor C2, a third capacitor C3, a first switch tube Q7, a second switch tube Q8, a first inductor L5, a second inductor L6, a third switch tube, and a fourth switch tube.

A positive bus BUS+ is connected to a first node a through the first switch tube Q7. A negative bus BUS− is connected to a second node b through the second switch tube Q8.

Two ends of the first capacitor C1 are respectively connected to the BUS+ and an N wire. Two ends of the second capacitor C2 are respectively connected to the BUS− and the N wire.

The third switch tube is connected between the first node a and the N wire.

The fourth switch tube is connected between the second node b and the N wire.

It should be noted that, the third switch tube and the fourth switch tube may be uncontrollable tubes, or may be controllable tubes. When the third switch tube and the fourth switch tube are uncontrollable tubes, the tubes may be diodes, and are, as shown in FIG. 5, a third diode D11 and a fourth diode D12 respectively.

A cathode of the third diode D11 is connected to the first node a and an anode thereof is connected to the N wire.

A cathode of the fourth diode D12 is connected to the N wire and an anode thereof is connected to the second node b.

The first inductor L5, a load, and the second inductor L6 connected in series are connected in sequence between the first node a and the second node b.

It should be noted that, the load of the DC-DC converter provided in the embodiment of the present invention may be a battery. As shown in FIG. 5, the load is a battery BAT, and the converter can be used in a UPS charger. It can be understood that, the load may be another ordinary load and is not limited to a battery in the embodiment of the present invention.

In this embodiment, one end of the third capacitor C3 is connected to the second node b and the other end thereof is connected to a common end of the battery BAT and the first inductor L5.

It should be noted that, the two ends of the third capacitor C3 may further be connected to the first node a and the second node b, or, the third capacitor C3 may be connected in parallel at two ends of the load, or, one end of the third capacitor C3 is connected to the first node a and the other end thereof is connected to a common end of the load and the second inductor L6.

In the DC-DC converter provided in the embodiment of the present invention, an input is connected to the BUS+, the BUS−, and the N wire. In this way, an input voltage is relatively low, and a device with low voltage resistance may be selected as a device in the DC-DC converter. Moreover, the load in the DC-DC converter is connected to the second switch tube Q8 through the second inductor L6 rather than be directly connected to the second switch tube Q8. Therefore, a high-frequency switch wave on the Q8 may not affect the load. In this case, performance of the load and an anti-electromagnetic interference capability of the whole circuit may be improved. In addition, the DC-DC converter provided in the embodiment of the present invention does not have a structure as complicated as that of a dual BUCK topology in the prior art. Therefore, the DC-DC converter, with respect to the dual BUCK topology, has less devices and lower costs.

It should be noted that, another embodiment of the DC-DC converter provided in the present invention further includes a third diode D13.

Figure 6:
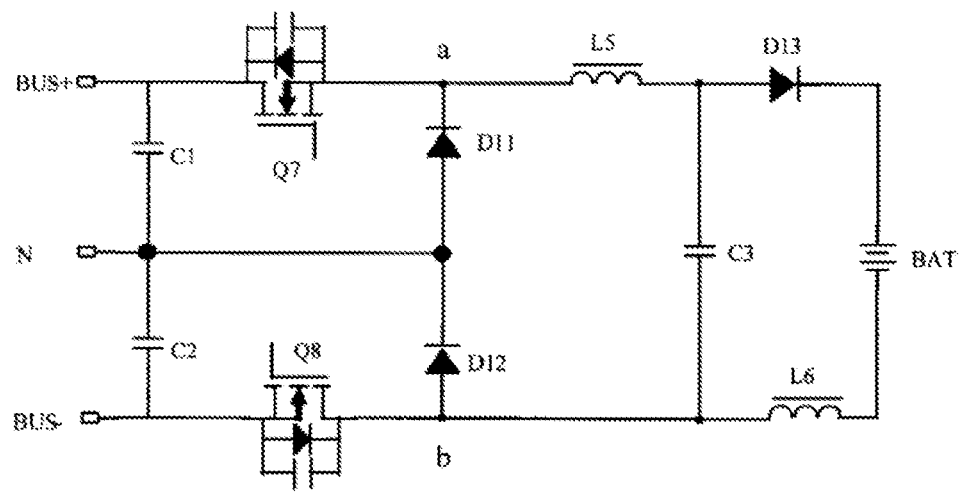
FIG. 6 is a schematic diagram of another embodiment of a DC-DC converter according to an embodiment of the present invention.

The third diode D13 is connected in series between the first inductor L5 and the load. As shown in FIG. 6, when the load is a BAT, the D13 is connected in series between an L5 and the BAT with a function of preventing backflow of a current.

Embodiment 2

Figure 7:
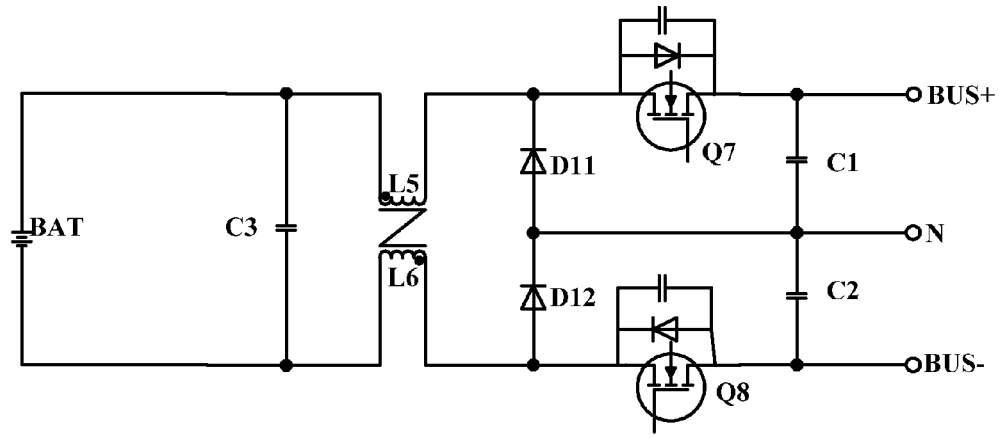
FIG. 7 is a schematic diagram of Embodiment 2 of a DC-DC converter according to an embodiment of the present invention.

Referring to FIG. 7, FIG. 7 is a schematic diagram of Embodiment 2 of a DC-DC converter provided in the present invention.

In the DC-DC converter provided in this embodiment, a first inductor L5 and a second inductor L6 are integrated together, for example, an L5 and an L6 shown in FIG. 7. In this way, a volume of the inductors can be reduced and the costs can be lowered.

It should be noted that, when the L5 and the L6 are integrated together, a third capacitor C3 is connected in parallel at two ends of a battery BAT.

Embodiment 3

Figure 8:
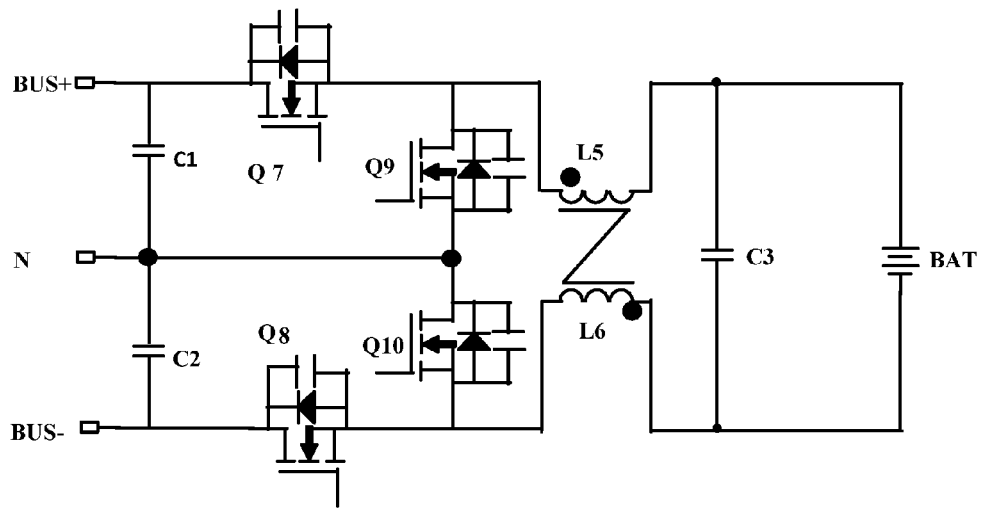
FIG. 8 is a schematic diagram of Embodiment 3 of a DC-DC converter according to an embodiment of the present invention.

Referring to FIG. 8, FIG. 8 is a schematic diagram of Embodiment 3 of a DC-DC converter provided in the present invention.

A difference between this embodiment and Embodiment 2 provided in FIG. 7 is that a third switch tube and a fourth switch tube are controllable tubes, for example, a Q9 and a Q10 in FIG. 8.

In the DC-DC converter provided in the embodiment shown in FIG. 8, an input and an output can be mutually converted in a two-way manner. For example, a BUS+ and a BUS− may serve as an input end of the converter and a BAT serves as an output end of the converter. In addition, the BAT may serve as the input end of the converter, and the BUS+ and the BUS− may serve as the output ends of the converter.

It should be noted that, the function of the C3 in all of the foregoing embodiments is output filtering. When a circuit works in a continuous mode, the function of the C3 is only output filtering. When the circuit works in a discontinuous mode, the C3 is further configured to provide a power supply to a load in addition to the function of output filtering.

The following takes an example where the load is the battery BAT to describe working principles when the DC-DC converter provided in the embodiment of the present invention is applied to a UPS charger.

Figure 9:
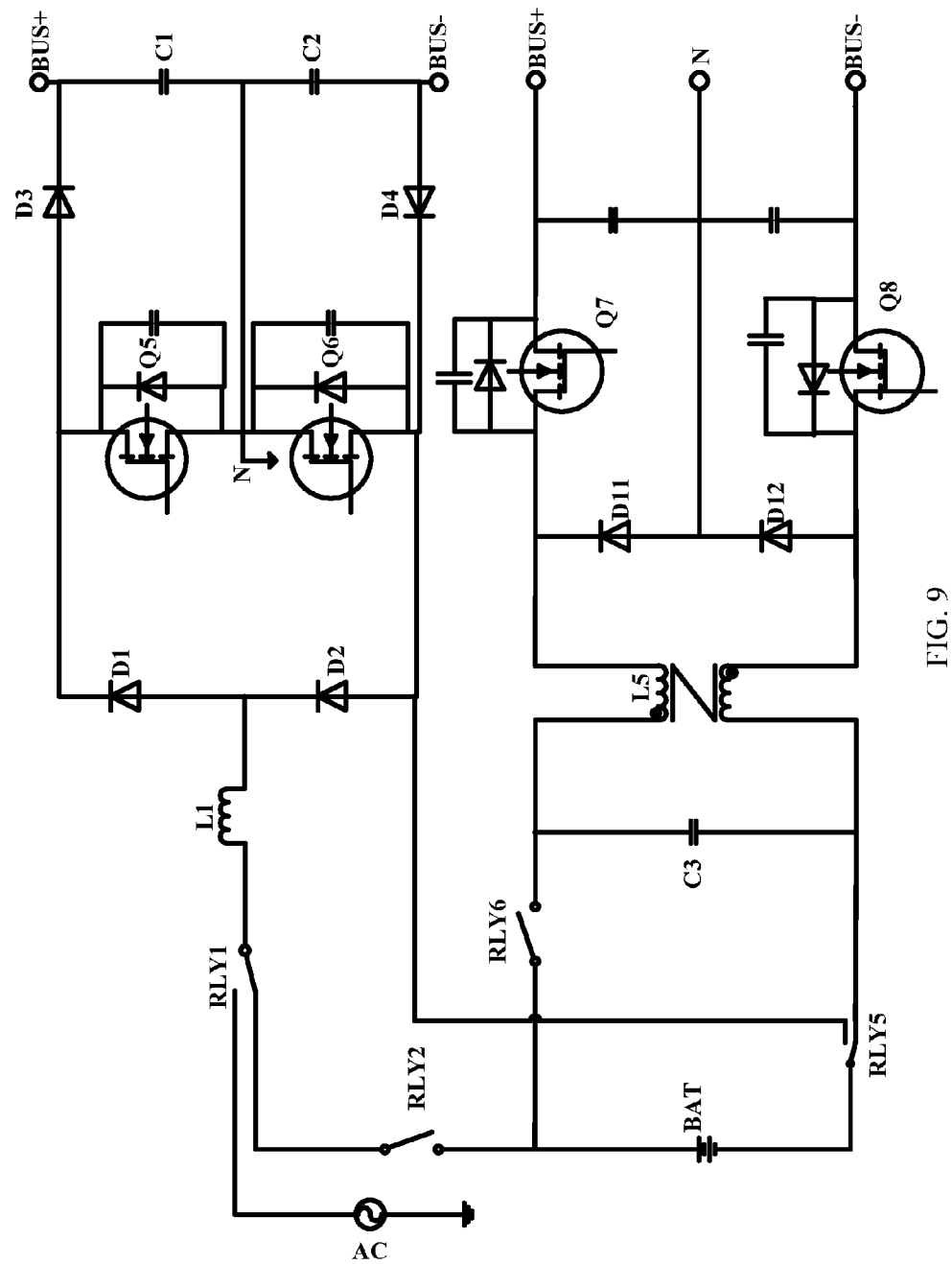
FIG. 9 is a schematic diagram of Application Embodiment 1 of a DC-DC converter according to an embodiment of the present invention.

Referring to FIG. 9, FIG. 9 is a schematic diagram of Application Embodiment 1 of a DC-DC converter provided in the present invention.

In FIG. 9, the DC-DC converter provided in the present invention is applied to a case where a Power Factor Correction (PFC) circuit is connected to a single-phase power grid voltage. Outputs of the PFC circuit are a BUS+, a BUS−, and an N wire.

The DC-DC converter provided in this embodiment, through different control manners, may implement the following three working modes.

First Working Mode:

It should be noted that, in the first working mode, the positive bus BUS+, the negative bus BUS−, and the N wire of the DC-DC converter are connected to an output end of a preceding-stage rectifying circuit. In this embodiment, an example where the preceding-stage rectifying circuit is a PFC circuit is taken for introduction.

The DC-DC converter works synchronously with the PFC. The first switch tube Q7 and the second switch tube Q8 work alternatively in a positive semi-cycle and a negative semi-cycle of a power grid voltage.

In the positive semi-cycle of the power grid voltage, the first switch tube Q7 works and the second switch tube Q8 is turned off.

When the first switch tube Q7 is turned on, a current flow direction is: positive bus BUS+-first switch tube Q7-first inductor L5-BAT-second inductor L6-second diode D12-N wire. The positive bus BUS+ charges the BAT through the inductor and enables the inductor to store energy at the same time.

When the first switch tube Q7 is cut off, a current flow direction is: first inductor L1-BAT-second inductor L6-second diode D12-first diode D11. The inductor releases the energy to charge the battery BAT.

In the negative semi-cycle of the power grid voltage, the first switch tube Q7 is turned off and the second switch tube Q8 works.

When the second switch tube Q8 is turned on, a current flow direction is: N wire-first diode D11-first inductor L5-BAT-second inductor L6-second switch tube Q8-negative bus BUS−. The negative bus BUS− charges the battery BAT through the inductor and enables the inductor to store energy.

When the second switch tube Q8 is cut off, a current flow direction is: first inductor L5-BAT-second inductor L6-second diode D12-first diode D11. The inductor releases the energy to charge the battery BAT.

Figure 10:
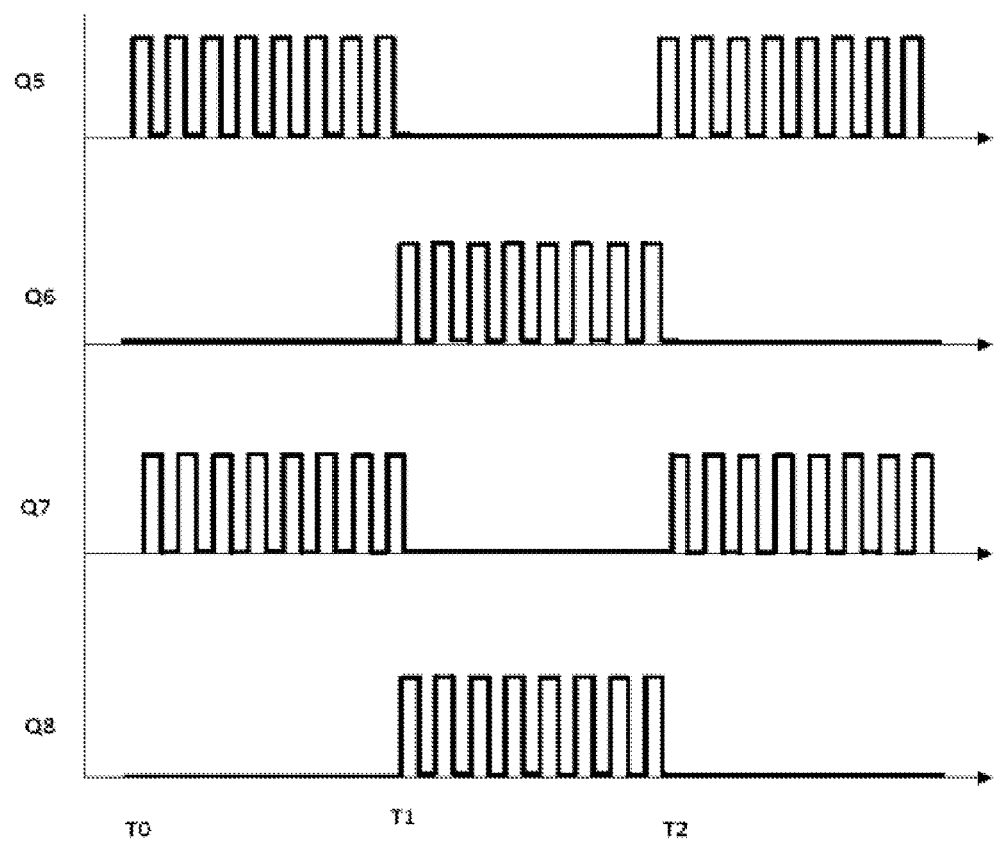
FIG. 10 is a sequence diagram of a first working mode corresponding to FIG. 9.

For a specific sequence diagram, reference may be made to FIG. 10. FIG. 10 is a sequence diagram of the first working mode corresponding to FIG. 9.

A Q5 and a Q6 are switch tubes in the PFC circuit. The Q7 and the Q8 are switch tubes in the DC-DC converter provided in the present invention. It can be seen from FIG. 10 that, working sequences of the Q7 and the Q8 are respectively the same as working sequences of the Q5 and the Q6.

T0-T1 is the positive semi-cycle of the power grid voltage and T1-T2 is the negative semi-cycle of the power grid voltage.

Figure 11:
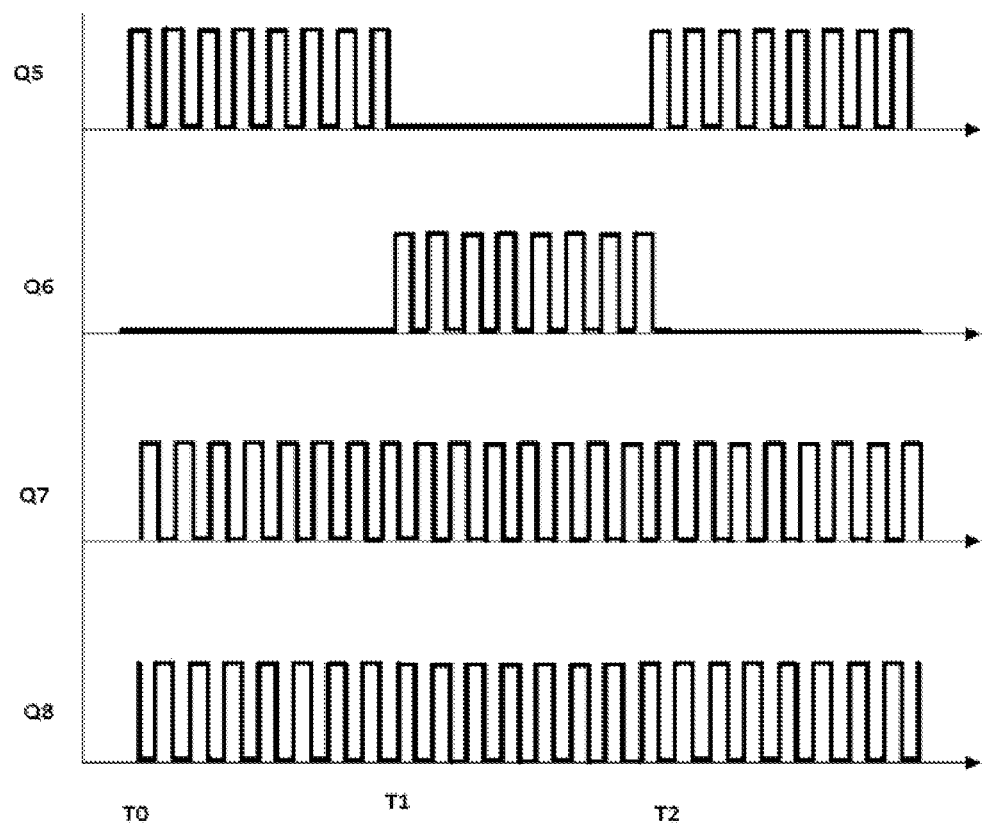
FIG. 11 is a sequence diagram of a second working mode corresponding to FIG. 9.

At the T0-T1 stage, the BUS+ charges the BAT.
At the T1-T2 stage, the BUS− charges the BAT.
Second Working Mode:

When the DC-DC converter is in the positive/negative semi-cycle of the power grid voltage, the working modes of the Q7 and the Q8 are the same. For a specific sequence diagram, reference may be made to FIG. 11. FIG. 11 is a sequence diagram of the second working mode corresponding to FIG. 9.

Driving pulse signals of the Q7 and the Q8 may be driven through interleaving Pulse Width Modulation (PWM). The two interleaved PWMs have a phase difference.

Preferentially, in this embodiment, the driving pulse signals of the Q7 and the Q8 may be driven through PWM with a phase difference of 180 degrees. The Q7 and the Q8 work alternatively.

In a first switch period, the first switch tube Q7 works and the second switch tube Q8 is turned off.

When the first switch tube Q7 is turned on, a current flow direction is: positive bus-first switch tube Q7-first inductor L5-load-second inductor L6-second diode D12-N wire.

When the first switch tube Q7 is cut off, a current flow direction is: first inductor L5-load-second inductor L6-second diode D12-first diode D11.

In a second switch period, the first switch tube Q7 is turned off and the second switch tube Q8 works.

When the second switch tube Q8 is turned on, a current flow direction is: N wire-first diode D11-first inductor L5-load-second inductor L6-second switch tube Q8-negative bus.

When the second switch tube Q8 is cut off, a current flow direction is: first inductor L5-load-second inductor L6-second diode D12-first diode D11.

T0-T1 is the positive semi-cycle of the power grid voltage and T1-T2 is the negative semi-cycle of the power grid voltage.

At the T0-T1 stage, the BUS+ charges the BAT.
At the T1-T2 stage, the BUS− charges the BAT.

It can be seen from FIG. 10 that, a sequence waveform of the Q7 differs with 180 degrees from that of the Q8. When the PWM for driving the Q7 is at a high level, the PWM for driving the Q8 is at a low level.

Figure 12:
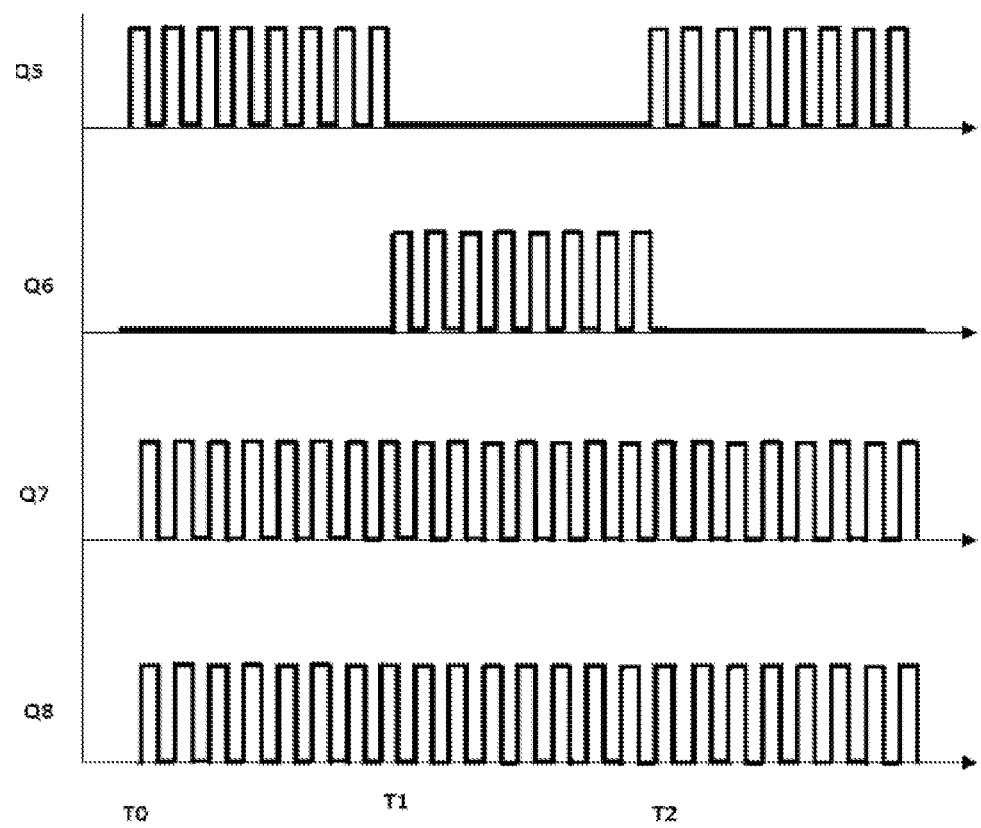
FIG. 12 is a sequence diagram of a third working mode corresponding to FIG. 9.

Third Working Mode:

The Q7 and the Q8 work at the same time in the positive semi-cycle and the negative semi-cycle of the power grid voltage and the driving pulse signals of the Q7 and the Q8 are the same. For a specific sequence diagram, reference may be made to FIG. 12. FIG. 12 is a sequence diagram of the third working mode corresponding to FIG. 9.

When both the Q7 and the Q8 are turned on, a current flow direction is: positive bus BUS+-first switch tube Q7-first inductor L5-BAT-second inductor L6-second switch tube Q8-negative bus BUS−. The positive bus BUS+ and the negative bus BUS− charge the battery BAT through the inductor L5 and enable the inductor to store energy.

When both the Q7 and the Q8 are cut off, a current flow direction is: first inductor L5-BAT-second inductor L6-second diode D12-first diode D11. The inductor releases the energy to charge the battery BAT.

It can be seen from FIG. 12 that, a waveform of the PWM for driving the Q7 is the same as that for driving the Q8.

The DC-DC converter shown in FIG. 9 works as a UPS charger. The BUS+, the BUS−, and the N wire serve as output ends of the PFC circuit.

(1) Work in a Mains Supply Mode:

A switch RLY1 is switched to an upper end, a switch RLY2 is turned off, a switch RLY6 is closed, and a switch RLY5 is switched to a lower end.

The PFC works in the mains supply mode. A power supply output by the PFC supplies power to the charger. The charger may work in either of the foregoing three working modes.

(2) Work in a Battery Mode:

The switch RLY1 is switched to a lower end, the switch RLY2 is closed, the switch RLY6 is turned off, and the switch RLY5 is switched to an upper end.

The battery supplies power to the PFC. The PFC works in the battery mode. The charger does not work.

It should be noted that, FIG. 9 shows an application scenario where the DC-DC converter provided in the embodiment shown in FIG. 7 is combined with a PFC circuit. It can be understood that, working principles of application scenarios where the DC-DC converters provided in the embodiments shown in FIG. 5, FIG. 6, and FIG. 8 of the present invention are combined with PFC circuits are the same, which are not described with examples one by one.

It can be seen from the above working modes that, a method for controlling the DC-DC converter provided in the embodiments of the present invention is flexible. The DC-DC converter may work synchronously with the PFC circuit, may also implement a frequency multiplication work through controlling a phase difference of 180 degrees between the Q7 and the Q8, and may further control the Q7 and the Q8 to work synchronously. Moreover, in the third working mode, a requirement for charging the battery when the power grid voltage is relatively low may also be satisfied.

Figure 13:
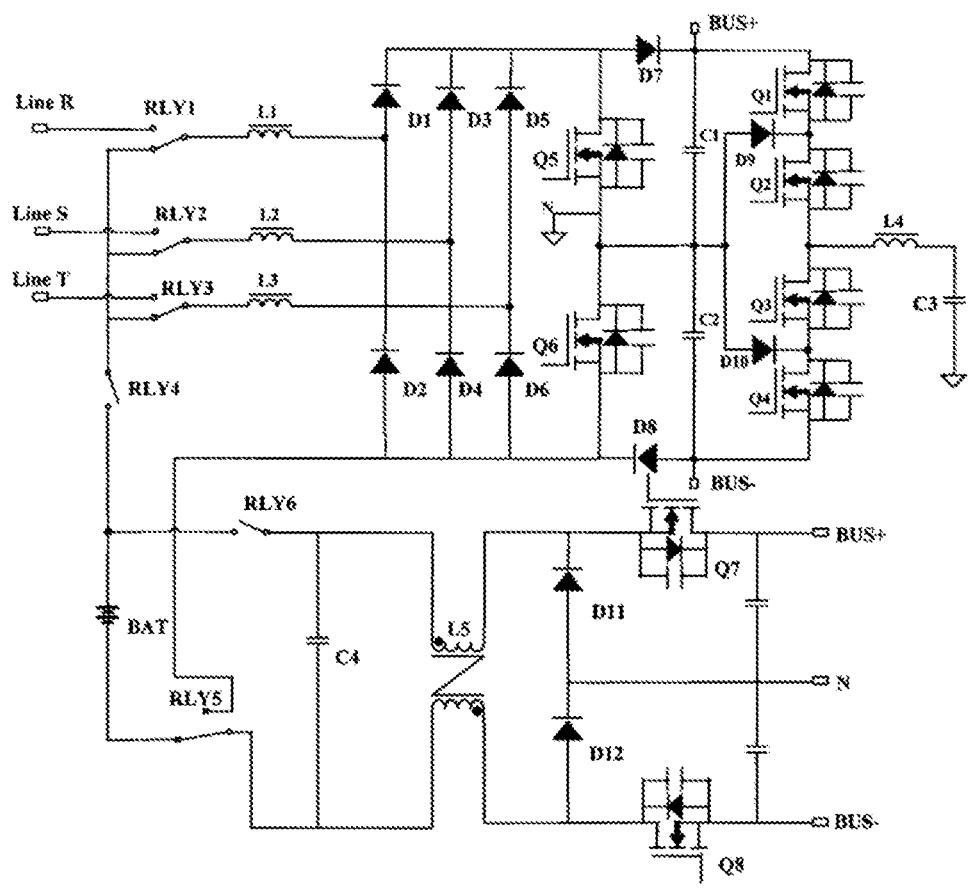
FIG. 13 is a schematic diagram of Application Embodiment 2 of a DC-DC converter according to an embodiment of the present invention.

It should be noted that, the application example shown in FIG. 9 works in a scenario of a single-phase mains supply. Likewise, the example may be applied to a scenario of a three-phase mains supply. For details, reference may be made to FIG. 13. FIG. 13 is a schematic diagram of Application Embodiment 2 of a DC-DC converter provided in the present invention.

As shown in FIG. 13, three phases of mains supply Line R, Line S, Line T are respectively connected, through three inductors L1, L2, and L3, to three bridge arms of a rectifying bridge composed by six diodes (a D1 to a D6). Output ends of the rectifying bridge are connected in parallel to a series bridge arm composed by switch tubes Q5 and Q6. A common end of the Q5 and the Q6 is connected to an N wire.

A positive output end of the rectifying bridge is connected to a positive bus BUS+ through a diode D7.

A negative output end of the rectifying bridge is connected to a negative bus BUS− through a diode D8.

The BUS+ is connected to the N wire through a capacitor C1. The BUS− is connected to the N wire through a capacitor C2.

An inversion module composed by four switch tubes (a Q1 to a Q4) is connected between the BUS+ and the BUS−.

The DC-DC converter provided in FIG. 13 works as a UPS charger. FIG. 13 shows a complete three-phase UPS circuit.

(1) Work in a Mains Supply Mode:

A switch RLY1, a switch RLY2, and a switch RLY3 are all switched to upper ends, a switch RLY4 is turned off, a switch RLY6 is closed, and a switch RLY5 is switched to a lower end. The PFC works in the mains supply mode. An output supplies power to the charger. The charger may work in either of the three modes.

(2) Work in a Battery Mode:

The switch RLY1, the switch RLY2, and the switch RLY3 are all switched to lower ends, the switch RLY4 is closed, the switch RLY6 is turned off, and the switch RLY5 is switched to an upper end. The battery supplies power to the PFC. The PFC works in the battery mode. The charger does not work. It should be noted that, in the embodiment shown in FIG. 13, a Q7 and a Q8, in different control manners, also correspond to three working modes, which are the same as the working modes of the embodiment shown in FIG. 9, and are not described again herein.

Disclosed above are merely exemplary embodiments of the present invention, but are not intended to limit any form of the present invention. Although the exemplary embodiments of the present invention are disclosed above, the embodiments are not intended to limit the present invention. By using the method and the technical content disclosed above, any persons of ordinary skill in the art can make a plurality of possible changes and modifications on the technical solutions of the present invention, or amend the technical solutions thereof to be embodiments with equal effects through equivalent variations without departing from the protection scope of the technical solutions of the present invention. Therefore, any simple amendments, equivalent variations, and modifications made on the above embodiments according to the technical essence of the present invention without departing from the content of the technical solutions of the present invention shall fall within the protection scope of the technical solutions of the present invention.

What is claimed is:

1. An uninterruptible power supply, comprising:
a rectifier;
an inverter; and
a direct current-direct current (DC-DC) converter,
wherein an input end of the rectifier is connected to a power grid and an output end thereof is connected to the inverter and the DC-DC converter,
wherein the rectifier is configured to convert an alternating current provided by the power grid into a direct current and output the direct current to the inverter or the DC-DC converter,
wherein an input end of the inverter is connected to the output end of the rectifier,
wherein the inverter is configured to invert the direct current obtained by the rectifier to an alternating current,
wherein an input end of the DC-DC converter is connected to the output end of the rectifier and an output end thereof is connected to a battery,
wherein the DC-DC converter is configured to charge the battery using the power supply output by the rectifier,
wherein the output end of the rectifier comprises a positive bus BUS+, a negative bus BUS−, and an N wire,
wherein an output end of the battery is connected to the rectifier, and a voltage output by the battery, after being boosted by the rectifier, provides a direct current to the inverter,
wherein the DC-DC converter comprises a first capacitor, a second capacitor, a third capacitor, a first switch tube, a second switch tube, a first inductor, a second inductor, a third switch tube, and a fourth switch tube,
wherein the positive bus BUS+ is connected to a first node through the first switch tube,
wherein the negative bus BUS− is connected to a second node through the second switch tube,
wherein two ends of the first capacitor are respectively connected to the BUS+ and the N wire; two ends of the second capacitor are respectively connected to the BUS− and the N wire,
wherein the third switch tube is connected between the first node and the N wire,
wherein the fourth switch tube is connected between the second node and the N wire,
wherein the first inductor, the battery, and the second inductor connected in series are connected in sequence between the first node and the second node,
wherein two ends of the third capacitor are respectively connected to the first node and the second node, or, the third capacitor is connected in parallel at two ends of the battery, or, one end of the third capacitor is connected to the first node and the other end thereof is connected to a common end of the battery and the second inductor, or, one end of the third capacitor is connected to the second node and the other end thereof is connected to a common end of the battery and the first inductor,
wherein working modes of the first switch tube and the second switch tube in a positive semi-cycle and a negative semi-cycle of a power grid voltage are the same, and wherein driving pulse signals of the first switch tube and the second switch tube drive through interleaving pulse width modulations (PWMs).

2. The uninterruptible power supply according to claim 1, wherein both the third switch tube and the fourth switch tube are uncontrollable diodes and are a third diode and a fourth diode respectively, wherein a cathode of the third diode is connected to the first node and an anode thereof is connected to the N wire, and wherein a cathode of the fourth diode is connected to the N wire and an anode thereof is connected to the second node.

3. The uninterruptible power supply according to claim 1, wherein the first inductor and the second inductor are integrated together.

4. The uninterruptible power supply according to claim 1, wherein the first switch tube and the second switch tube work alternatively in a positive semi-cycle and a negative semi-cycle of a power grid voltage, wherein in the positive semi-cycle of the power grid voltage, the first switch tube works and the second switch tube is turned off, wherein when the first switch tube is turned on, a current flow direction is: positive bus BUS+-first switch tube-first inductor-batty-second inductor-second diode-N wire, wherein when the first switch tube is cut off, a current flow direction is: first inductor battery-second inductor-second diode-first diode, wherein in the negative semi-cycle of the power grid voltage, the first switch tube is turned off and the second switch tube works, wherein when the second switch tube is turned on, a current flow direction is: N wire-first diode-first inductor battery-second inductor-second switch tube-negative bus BUS−, and wherein when the second switch tube is cut off, a current flow direction is: first inductor battery-second inductor-second diode-first diode.

5. The uninterruptible power supply according to claim 1, wherein the driving pulse signals of the first switch tube and the second switch tube drive through PWMs with a phase difference of 180 degrees, and the first switch tube and the second switch tube work alternatively, wherein in a first switch period, the first switch tube works and the second switch tube is turned off, wherein when the first switch tube is turned on, a current flow direction is: positive bus BUS+-first switch tube-first inductor battery-second inductor-second diode-N wire, wherein when the first switch tube is cut off, a current flow direction is: first inductor battery-second inductor-second diode-first diode, wherein in a second switch period, the first switch tube is turned off and the second switch tube works, wherein when the second switch tube is turned on, a current flow direction is: N wire-first diode-first inductor battery-second inductor-second switch tube-negative bus BUS−, and wherein when the second switch tube is cut off, a current flow direction is: first inductor battery-second inductor-second diode-first diode.

6. An uninterruptible power supply, comprising:
a rectifier;
an inverter; and
a direct current-direct current (DC-DC) converter,
wherein an input end of the rectifier is connected to a power grid and an output end thereof is connected to the inverter and the DC-DC converter,
wherein the rectifier is configured to convert an alternating current provided by the power grid into a direct current and output the direct current to the inverter or the DC-DC converter,
wherein an input end of the inverter is connected to the output end of the rectifier, wherein the inverter is configured to invert the direct current obtained by the rectifier to an alternating current,
wherein an input end of the DC-DC converter is connected to the output end of the rectifier and an output end thereof is connected to a battery,
wherein the DC-DC converter is configured to charge the battery using the power supply output by the rectifier,
wherein the output end of the rectifier comprises a positive bus BUS+, a negative bus BUS−, and an N wire,
wherein an output end of the battery is connected to the rectifier, and a voltage output by the battery, after being boosted by the rectifier, provides a direct current to the inverter,
wherein the DC-DC converter comprises a first capacitor, a second capacitor, a third capacitor, a first switch tube, a second switch tube, a first inductor, a second inductor, a third switch tube, and a fourth switch tube,
wherein the positive bus BUS+ is connected to a first node through the first switch tube,
wherein the negative bus BUS− is connected to a second node through the second switch tube,
wherein two ends of the first capacitor are respectively connected to the BUS+ and the N wire; two ends of the second capacitor are respectively connected to the BUS− and the N wire,
wherein the third switch tube is connected between the first node and the N wire,
wherein the fourth switch tube is connected between the second node and the N wire,
wherein the first inductor, the battery, and the second inductor connected in series are connected in sequence between the first node and the second node,
wherein two ends of the third capacitor are respectively connected to the first node and the second node, the third capacitor is connected in parallel at two ends of the battery, one end of the third capacitor is connected to the first node and the other end thereof is connected to a common end of the battery and the second inductor, or one end of the third capacitor is connected to the second node and the other end thereof is connected to a common end of the battery and the first inductor,
wherein the first switch tube and the second switch tube work at the same time in a positive semi-cycle and a negative semi-cycle of a power grid voltage, and a driving pulse signal of the first switch tube is the same as that of the second switch tube,
wherein when both the first switch tube and the second switch tube are turned on, a current flow direction is: positive bus BUS+-first switch tube-first inductor battery-second inductor-second switch tube-negative bus BUS−, and
wherein when both the first switch tube and the second switch tube are cut off, a current flow direction is: first inductor battery-second inductor-second diode-first diode.

7. A direct current-direct current (DC-DC) converter, comprising:
a first capacitor;
a second capacitor;
a third capacitor;
a first switch tube connected to the first capacitor;
a second switch tube connected to the second capacitor;
a first inductor connected to the first switch tube;
a second inductor connected to the second switch tube;
a third switch tube connected to the first inductor; and
a fourth switch tube connected to the second inductor, wherein a positive bus BUS+ is connected to a first node through the first switch tube, wherein a negative bus BUS− is connected to a second node through the second switch tube, wherein two ends of the first capacitor are respectively connected to the BUS+ and the N wire, wherein two ends of the second capacitor are respectively connected to the BUS− and the N wire, wherein the third switch tube is connected between the first node and the N wire, wherein the fourth switch tube is connected between the second node and the N wire, wherein the first inductor, a load, and the second inductor connected in series are connected in sequence between the first node and the second node, wherein two ends of the third capacitor are respectively connected to the first node and the second node, or, the third capacitor is connected in parallel at two ends of the load, or, one end of the third capacitor is connected to the first node and the other end thereof is connected to a common end of the load and the second inductor, or, one end of the third capacitor is connected to the second node and the other end thereof is connected to a common end of the load and the first inductor, wherein working modes of the first switch tube and the second switch tube in a positive semi-cycle and a negative semi-cycle of a power mid voltage are the same, and wherein driving pulse signals of the first switch tube and the second switch tube drive through interleaving pulse width modulations (PWMs).

8. The DC-DC converter according to claim 7, wherein both the third switch tube and the fourth switch tube are uncontrollable diodes and are a third diode and a fourth diode respectively, wherein a cathode of the third diode is connected to the first node and an anode thereof is connected to the N wire, and wherein a cathode of the fourth diode is connected to the N wire and an anode thereof is connected to the second node.

9. The DC-DC converter according to claim 7, wherein both the third switch tube and the fourth switch tube are controllable switch tubes.

10. The DC-DC converter according to claim 7, wherein the first inductor and the second inductor are integrated together.

11. The DC-DC converter according to claim 8, further comprising a fifth diode, wherein the fifth diode is connected in series between the first inductor and the load.

12. The DC-DC converter according to claim 7, wherein the first switch tube and the second switch tube work alternatively in a positive semi-cycle and a negative semi-cycle of a power grid voltage, wherein in the positive semi-cycle of the power grid voltage, the first switch tube works and the second switch tube is turned off, wherein when the first switch tube is turned on, a current flow direction is: positive bus BUS+-first switch tube-first inductor-load-second inductor-second diode-N wire, wherein when the first switch tube is cut off, a current flow direction is: first inductor-load-second inductor-second diode-first diode, wherein in the negative semi-cycle of the power grid voltage, the first switch tube is turned off and the second switch tube works, wherein when the second switch tube is turned on, a current flow direction is: N wire-first diode-first inductor-load-second inductor-second switch tube-negative bus BUS−, and wherein when the second switch tube is cut off, a current flow direction is: first inductor-load-second inductor-second diode-first diode.

13. The DC-DC converter according to claim 7, wherein the driving pulse signals of the first switch tube and the second switch tube drive through PWMs with a phase difference of 180 degrees, and the first switch tube and the second switch tube work alternatively, wherein in a first switch period, the first switch tube works and the second switch tube is turned off, wherein when the first switch tube is turned on, a current flow direction is: positive bus BUS+-first switch tube-first inductor-load-second inductor-second diode-N wire, wherein when the first switch tube is cut off, a current flow direction is: first inductor-load-second inductor-second diode-first diode, wherein in a second switch period, the first switch tube is turned off and the second switch tube works, wherein when the second switch tube is turned on, a current flow direction is: N wire-first diode-first inductor-load-second inductor-second switch tube-negative bus BUS−, and wherein when the second switch tube is cut off, a current flow direction is: first inductor-load-second inductor-second diode-first diode.

14. A direct current-direct current (DC-DC) converter, comprising:

a first capacitor;

a second capacitor;

a third capacitor;

a first switch tube connected to the first capacitor;

a second switch tube connected to the second capacitor;

a first inductor connected to the first switch tube;

a second inductor connected to the second switch tube;

a third switch tube connected to the first inductor; and a fourth switch tube connected to the second inductor, wherein a positive bus BUS+ is connected to a first node through the first switch tube, wherein a negative bus BUS− is connected to a second node through the second switch tube, wherein two ends of the first capacitor are respectively connected to the BUS+ and the N wire, wherein two ends of the second capacitor are respectively connected to the BUS− and the N wire, wherein the third switch tube is connected between the first node and the N wire, wherein the fourth switch tube is connected between the second node and the N wire, wherein the first inductor, a load, and the second inductor connected in series are connected in sequence between the first node and the second node, wherein two ends of the third capacitor are respectively connected to the first node and the second node, the third capacitor is connected in parallel at two ends of the load, one end of the third capacitor is connected to the first node and the other end thereof is connected to a common end of the load and the second inductor, or one end of the third capacitor is connected to the second node and the other end thereof is connected to a common end of the load and the first inductor, wherein the first switch tube and the second switch tube work at the same time in a positive semi-cycle and a negative semi-cycle of a power grid voltage, and a driving pulse signal of the first switch tube is the same as that of the second switch tube, wherein when both the first switch tube and the second switch tube are turned on, a current flow direction is: positive bus BUS+-first switch tube-first inductor-load-second inductor-second switch tube-negative bus BUS−, and wherein when both the first switch tube and the second switch tube are cut off, a current flow direction is: first inductor-load-second inductor-second diode-first diode.

15. The DC-DC converter according to claim 7, wherein the load is a battery.

16. The DC-DC converter according to claim 14, wherein both the third switch tube and the fourth switch tube are uncontrollable diodes and are a third diode and a fourth diode respectively, wherein a cathode of the third diode is connected to the first node and an anode thereof is connected to the N wire, and wherein a cathode of the fourth diode is connected to the N wire and an anode thereof is connected to the second node.

17. The DC-DC converter according to claim 14, wherein both the third switch tube and the fourth switch tube are controllable switch tubes.

18. DC-DC converter according to claim 14, wherein the first inductor and the second inductor are integrated together.

19. The DC-DC converter according to claim 18, further comprising a fifth diode, wherein the fifth diode is connected in series between the first inductor and the load.

20. The DC-DC converter according to claim 14, wherein the load is a battery.

* * * * *

UNITED STATES PATENT AND TRADEMARK OFFICE
CERTIFICATE OF CORRECTION

PATENT NO. : 9,564,775 B2  
APPLICATION NO. : 14/143106  
DATED : February 7, 2017  
INVENTOR(S) : Peiguo Liu, Zhenfu Fei and Yanan Zhou Page 1 of 1

It is certified that error appears in the above-identified patent and that said Letters Patent is hereby corrected as shown below:

In the Claims

Column 15, Line 27, Claim 7: delete "negative semi-cycle of a power mid voltage are the" and insert --negative semi-cycle of a power grid voltage are the--

Signed and Sealed this  
Ninth Day of May, 2017

Michelle K. Lee  
*Director of the United States Patent and Trademark Office*